Patented May 14, 1935

2,001,221

UNITED STATES PATENT OFFICE 2,001,221

PRODUCTION OF 1,4-DIAMINO-2-ARYLOXY-ANTHRAQUINONE-3-SULPHONIC ACID

Berthold Stein, Mannheim, and Fritz Baumann, Leverkusen, Germany, assignors to General Aniline Works, Inc., New York, N. Y., a corporation of Delaware No Drawing. Application March 30, 1933, Serial No. 663,654. In Germany April 5, 1932

4 Claims. (Cl. 260—59)

The present invention relates to a process for the production of 1,4-diamino-2-aryloxyanthraquinone-3-sulphonic acid. In the application Ser. No. 557,943, filed on August 18th, 1931, there is described a process for the production of 1,4-diamino-2-aryloxyanthraquinone-3-sulphonic acids by heating an 1,4-diamino-2,3-dihalogenanthraquinone under atmospheric pressure with a phenol and a sulphite of a strong, preferably inorganic, base in the presence of water.

We have now found that 1,4-diamino-2-aryloxyanthraquinone-3-sulphonic acids are obtained by an even smoother reaction and with the suppression of the formation of bye-products by heating 1,4-diamino-2,3-dihalogenanthraquinones with phenol compounds and salts, in particular water-soluble inorganic salts, of sulphurous acid in the presence of water and of suitable metal compounds. As phenol compounds which may be used according to the present invention there may be mentioned besides phenol itself for example substituted phenols such as the cresols, chlorophenols, and naphthols. Suitable metal compounds are those which have acid binding properties but the alkalinity of which is neither sufficient to split off or replace by hydroxy groups the halogen atoms present in the molecule ot the initial material nor sufficient to have a saponifying action on the aryloxy groups which are introduced. In many cases it will be advantageous to apply metal compounds possessing oxidizing properties besides the properties above mentioned. As examples of such metal compounds may be mentioned alkali metal perborates, and oxides or hydroxides of metals which do not belong to the alkali metal or alkaline earth metal series, as for example pyrolusite, lead peroxide, magnesium oxide and zinc oxide.

The best results are usually obtained by carrying out the reaction under pressure at a temperature of from 120° to 160° C. but the invention is not restricted to working under the said conditions. Employing a large excess of phenols (at least 10 molecular proportions to each molecular proportion of the anthraquinone derivatives) and working in the presence of water have proved especially advantageous because in this way a previous making of the initial material into a fine paste is superfluous. At the same time a separation of the reaction products readily soluble in the aromatic compounds from water-soluble impurities may be effected by drawing off separately the single layers, as a large excess of aromatic hydroxy compounds is employed and as the reaction products are very difficultly soluble in the aqueous solution of salts almost the entire quantity of the reaction products can be obtained in this manner practically free from water-soluble impurities. The salts of sulphurous acid are also preferably employed in excess (from about 2 to 3 molecular proportions to each molecular proportion of anthraquinone derivatives employed). The reaction is completed as soon as initial material insoluble in water can no longer be detected.

The peculiar action of metal compounds of the said kind on the reaction between 1,4-diamino-2,3-dihalogen-anthraquinones and aryloxy compounds and salts of sulphurous acid was not to be foreseen; this is especially the case with metal compounds which at the same time have an oxidizing character because it would be expected that the added salts of sulphurous acid would be destroyed by such compounds. That this is not the case may be seen, inter alia, from the fact that at the end of the reaction the said metal compounds are converted at least partly into salts of sulphurous acid.

The following examples will further illustrate the nature of this invention but the invention is not restricted to these examples. The parts are by weight.

Example 1

92.4 parts of 1,4-diamino-2,3-dichloranthraquinone, 540 parts of phenol, 228 parts of crystallized sodium sulphite, 24 parts of pyrolusite and 900 parts of water are heated to 130° C. in an iron autoclave provided with stirring apparatus until a sample withdrawn and worked up dissolves completely in water. When the reaction is completed and while the reaction mixture is at about 50° C., the supernatant aqueous layer is removed and the phenolic solution of the dyestuff is subjected to steam distillation. In order to remove insoluble inorganic constituents the solution of dyestuff may be filtered while hot and precipitated by means of common salt. In this manner the dyestuff is obtained in a very pure state and in an excellent yield. By conversion into the free acid a chemically pure substance is obtained the analysis of which gives the following values:—

Found:— C=58.7 per cent H=3.6 N=6.8 S=7.8

Calculated on diamino-phenoxy-anthraquinone-sulphonic acid:—

C=58.5 per cent H=3.4 N=6.8 S=7.8

Instead of pyrolusite, lead peroxide may be employed. Moreover the 1,4-diamino-2,3-dichloranthraquinone may be replaced by 1,4-diamino-2,3-dibromanthraquinone.

Example 2

30.8 parts of 1,4-diamino-2,3-dichloranthraquinone, 150 parts of phenol, 80 parts of crystallized sodium sulphite, 6 parts of magnesia and 300 parts of water are heated at 140° C. in an iron autoclave until the anthraquinone component has become soluble in water. At the said temperature the pressure rises to from 4.5 to 5 atmospheres. The finished melt is then immediately subjected to steam distillation, the violet solution is filtered after removing the phenol and the dyestuff is salted out; or, after withdrawing the aqueous upper layer, the phenolic solution of the dyestuff may be directly evaporated to dryness in vacuo. If it is desired to remove the inorganic salts insoluble in water, the dyestuff is dissolved in water, the solution filtered and the dyestuff salted out.

Example 3

30 parts of 1,4-diamino-2,3-dichloroanthraquinone are introduced into 180 parts of meta-cresol while stirring. 400 parts of a 10 per cent aqueous solution of sodium sulphite and 12 parts of pyrolusite are added and the mixture is heated for about 5 hours in an autoclave to 140° C. After cooling the solution of the dyestuff formed in the excess of meta-cresol is separated from the aqueous layer and washed several times with salt solution. Then the dyestuff is precipitated by the addition of caustic soda solution. The dyestuff is dissolved in water, filtered and salted out by means of sodium chloride. It is obtained in the form of large blue needles.

The dyestuff is soluble in water giving a blue coloration and dyes wool clear blue violet shades of good fastness. The solution of the dyestuff in sulphuric acid is colorless and becomes greenish blue upon the addition of formaldehyde.

If instead of meta-cresol para-chlorphenol is used a dyestuff is obtained having similar properties but dissolving in water somewhat more difficultly.

From 1,4-diamino-2,3-dichloroanthraquinone and beta-naphthol a dyestuff may be obtained in an analogous manner dyeing wool marine-blue shades.

What we claim is:—

1. The process of producing 1,4-diamino-2-aryloxyanthraquinone-3-sulphonic acids which comprises heating an 1,4-diamino-2,3-dihalogenanthraquinone with a phenol and a salt of sulphurous acid in the presence of water and pyrolusite.

2. The process of producing 1,4-diamino-2-aryloxyanthraquinone-3-sulphonic acids which comprises heating an 1,4-diamino-2,3-dihalogenanthraquinone under pressure at a temperature of from 120° to 160° C. with a phenol and a salt of sulphurous acid in the presence of water and an acid-binding metal compound, the alkalinity of which is insufficient to split off the halogen atoms and to saponify the aryloxy group which is introduced.

3. The process of producing 1,4-diamino-2-aryloxyanthraquinone-3-sulphonic acids which comprises heating an 1,4-diamino-2,3-dihalogenanthraquinone with a phenol and a salt of sulphurous acid in the presence of water and an acid-binding metal compound selected from the class consisting of the alkali metal perborates and the oxides and hydroxides of metals other than the alkali metals and alkaline earth metals.

4. The process of producing 1,4-diamino-2-aryloxyanthraquinone-3-sulphonic acids which comprises heating an 1,4-diamino-2,3-dihalogenanthraquinone with a phenol and a salt of sulphurous acid in the presence of water and an acid-binding metal compound selected from the class consisting of the alkali metal perborates, pyrolusite, lead peroxide, magnesium oxide and zinc oxide.

BERTHOLD STEIN.
FRITZ BAUMANN.